United States Patent [19]

Takayanagi et al.

[11] Patent Number: 5,127,317
[45] Date of Patent: Jul. 7, 1992

[54] BEVERAGE EXTRACTING APPARATUS FOR VENDING MACHINES

[75] Inventors: Yasushi Takayanagi; Ryoichi Sekiguchi, both of Gunma, Japan

[73] Assignee: Sanden Corporation, Gunma, Japan

[21] Appl. No.: 542,773

[22] Filed: Jun. 25, 1990

[30] Foreign Application Priority Data

Jun. 23, 1989 [JP] Japan ................. 1-161902

[51] Int. Cl.⁵ ............................................. A47J 31/32
[52] U.S. Cl. .................................. 99/289 T; 99/302 R
[58] Field of Search ............... 99/289 R, 289 T, 292, 99/279, 295, 299, 300, 302 R, 275, 286, 287, 298, 304, 307, 316, 323.1, 323.3; 426/432, 433; 137/197, 576

[56] References Cited

U.S. PATENT DOCUMENTS

| | | |
|---|---|---|
| 3,213,777 | 10/1965 | Heier ................. 99/289 T |
| 3,292,526 | 12/1966 | Heier ................. 99/289 R |
| 3,440,952 | 4/1969 | Merola et al. ......... 99/289 R |
| 3,478,671 | 11/1969 | Fuqua et al. .......... 99/302 R |
| 3,683,790 | 8/1972 | Black et al. .......... 99/300 X |
| 4,271,752 | 6/1981 | Valente et al. ........ 99/289 R |
| 4,271,753 | 6/1981 | Neely ................. 99/289 R |
| 4,389,924 | 6/1983 | Hoesselbarth ......... 99/289 R |
| 4,389,925 | 6/1983 | Piana . | |
| 4,457,216 | 7/1984 | Dremmel .............. 99/287 |
| 4,506,596 | 3/1985 | Shigenobu et al. ..... 99/289 T |
| 4,612,850 | 9/1986 | Kanazashi et al. . | |
| 4,648,313 | 3/1987 | Kokubun et al. ....... 99/289 R |
| 4,667,585 | 5/1987 | Harashima et al. . | |
| 4,715,270 | 12/1987 | Harada ............... 99/289 R |
| 4,984,511 | 1/1991 | Sekiguchi ............ 99/302 R X |
| 4,998,462 | 3/1991 | Sekiguchi ............ 99/302 R X |

FOREIGN PATENT DOCUMENTS

| | | | |
|---|---|---|---|
| 353787 | 2/1990 | European Pat. Off. ......... | 99/289 R |
| 2611484 | 9/1977 | Fed. Rep. of Germany ...... | 99/279 |
| 255092 | 8/1981 | Japan .................... | 99/287 |

Primary Examiner—Harvey C. Hornsby
Assistant Examiner—C. Cooley
Attorney, Agent, or Firm—Banner, Birch, McKie & Beckett

[57] ABSTRACT

A beverage extracting apparatus for vending machines includes a cylindrical mixing chamber having an inflow port on its upper portion and an opening on its bottom portion. A first valve mechanism opens and closes the inflow port. A second auxiliary valve mechanism of a smaller diameter than the first valve mechanism seats against the first valve mechanism. After the brewing operation is completed, the mixing chamber is exhausted of high pressure gas by the unseating of the auxiliary valve mechanism.

23 Claims, 4 Drawing Sheets

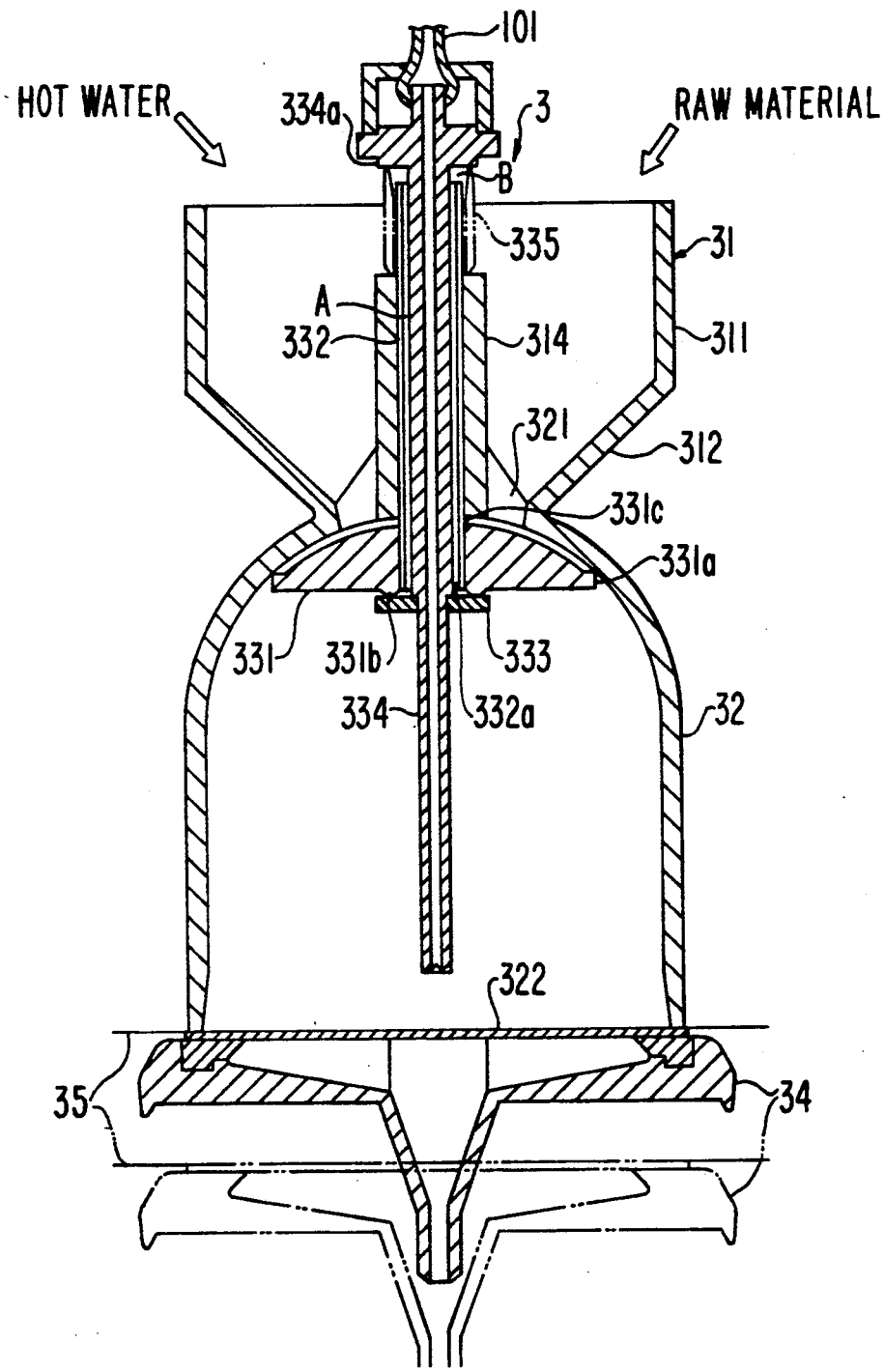

BEVERAGE EXTRACTING APPARATUS FOR VENDING MACHINES

TECHNICAL FIELD

The present invention relates to a beverage extracting apparatus for vending machines which mixes the water and raw material of a beverage, filters the liquid mixture, and extracts the filtrated liquid mixture.

BACKGROUND OF THE INVENTION

A conventional beverage extracting apparatus for vending machines is shown in FIGS. 1 and 2 (Japanese Patent Publication SHO 62-182897). A liquid mixture of water and the beverage raw material, for example a powder, is introduced into cylindrical mixing chamber 1 through inflow port 1a. Before valve 2 opens the inflow port 1a, bottom opening 1b is closed as a segment of a rolled filter sheet 4 is raised by filter support 5. Filter support 5 is urged downwardly by return spring 5a which also provides for the opening and closing of bottom opening 1b. After the liquid mixture is stored in mixing chamber 1, valve 2 is closed and pressurized air is supplied into the cylinder from pressurized air generating means to agitate the mixture. Liquid mixture stored in mixing chamber 1 is forcibly filtrated and extracted by the pressurized air through filter 4.

A conventional filter support drive mechanism 6 is constructed, for example, as shown in FIG. 2. Cam 6b is rotated by motor 6a causing transmitting mechanism 6c to move downwardly. Lever 6e pivotably supported at position 6f is rotated between the positions illustrated by the continuous line and the dashed line in FIG. 2 by engaging the bottom portion of transmitting mechanism 6c with one end of lever 6e. The other end of lever 6e engages lifting frame 6d attached to filter support 5. When lever 6e is rotated clockwise from the position shown by the continuous line to the position shown by the dashed line, filter support 5 is raised with lifting frame 6d. Consequently, the bottom opening 1b is closed by filter support 5 and filter 4 as shown in FIG. 1.

After the liquid mixture stored in cylinder 1 is forcibly filtrated and extracted through filter 4, valve 2 opens inflow port 1a, and the bottom opening 1b is again opened. If bottom opening 1b is opened before valve 2 opens inflow port 1a, then the spent grounds left on filter 4 and the liquid mixture left in cylinder 1 are exhausted by the high pressure in cylinder 1 to the inside of the vending machine.

However, in the construction of the above beverage extracting mechanism, the opening of inflow port 1a is formed relatively large to introduce the hot water and the raw material of the beverage into cylinder 1 as quickly as possible. Accordingly, the diameter of valve 2 is large to accommodate the large flow rate through inflow port 1a. Consequently, valve 2 receives a large biasing pressure due to the high pressure in cylinder 1. As a result, it is necessary for a large driving force to be added to valve 2 to open inflow port 1a. Therefore, a large valve driving mechanism is needed. In addition, when valve 2 opens inflow port 1a, hot water on the surface of valve 2 exhausts through inflow port 1a with the possibility of hot water contaminating and clogging outlet of a conduit for introducing the raw material.

SUMMARY OF THE INVENTION

It is a primary object of this invention to provide a beverage extracting apparatus for a vending machine which can use a valve driving mechanism of relatively small capacity.

It is another object of this invention to provide a beverage extracting apparatus for a vending machine which can prevent exhausting liquid mixture to the inside of a vending machine.

A preferred beverage extracting apparatus for vending machines according to the present invention includes a cylindrical hopper connected to a supply port. Water and beverage raw material are introduced into the hopper. A cylindrical mixing chamber has an inflow port on its upper portion and an opening on its bottom portion. A liquid mixture of water and beverage raw material is discharged into the mixing chamber from the hopper through the inflow port. A valve mechanism opens and closes the inflow port of the cylinder. A filter, supported by a filter support from the lower end of the filter, covers the bottom opening of the cylinder. The filter support opens and closes the bottom opening of the cylinder by vertically moving the filter. A pressurization mechanism supplies pressurized air into the cylinder through an air tube when the inflow port is closed by the valve mechanism and the bottom opening is closed by the filter to forcibly filtrate the liquid mixture stored in the mixing chamber. A cylindrical valve support is fixedly disposed in the hopper and extends to the inflow port. The valve mechanism includes a cylindrical main valve shaft which extends inside of the cylindrical valve support and which has a main valve at its bottom end for opening and closing the inflow port. An auxiliary valve shaft extends inside of the cylindrical valve support through the cylindrical main valve shaft. A gap is developed between the inner surface of the main valve shaft and the outer surface of the auxiliary valve shaft. An auxiliary valve is fixedly disposed on the auxiliary valve shaft for opening and closing the opening of the main valve shaft at its lower end and is connected to a driving source at its head portion. A coil spring is disposed between the lower end of the head portion and the upper end of the cylindrical valve support for urging the auxiliary valve shaft upward to have the auxiliary valve close the opening of the main valve shaft.

Further objects, features and other aspects of this invention will be understood from the following detailed description of the preferred embodiment of this invention with reference to the attached drawings.

BRIEF DESCRIPTION OF THE DRAWINGS

FIG. 4 is a cross-sectional view of a main portion of a beverage extracting apparatus as shown in FIG. 3.

DETAILED DESCRIPTION OF THE PREFERRED EMBODIMENTS

Figure 1:
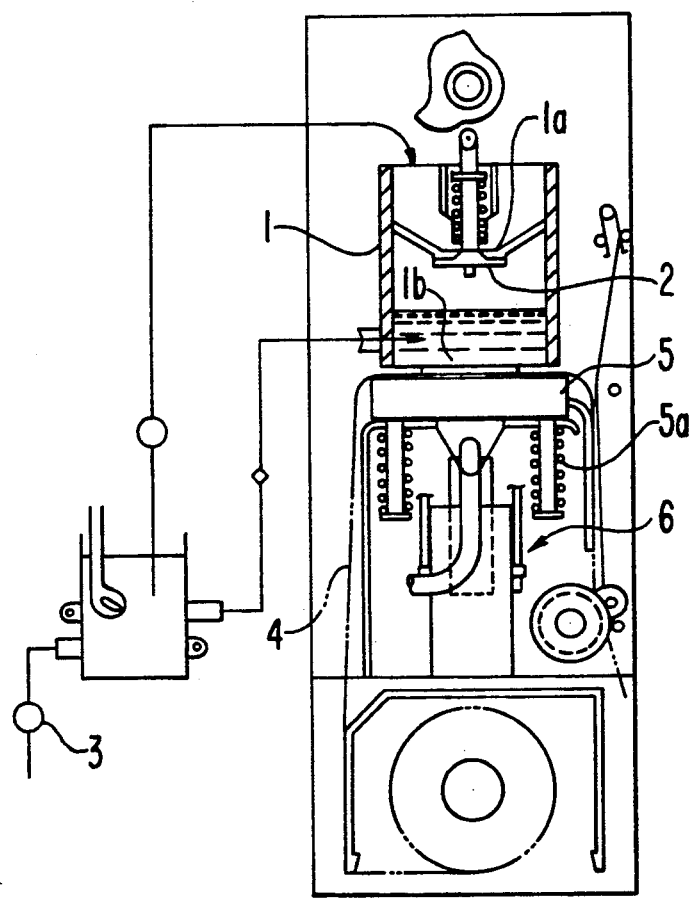
FIG. 1 is an elevational view of a prior art beverage extracting apparatus.
Figure 2:
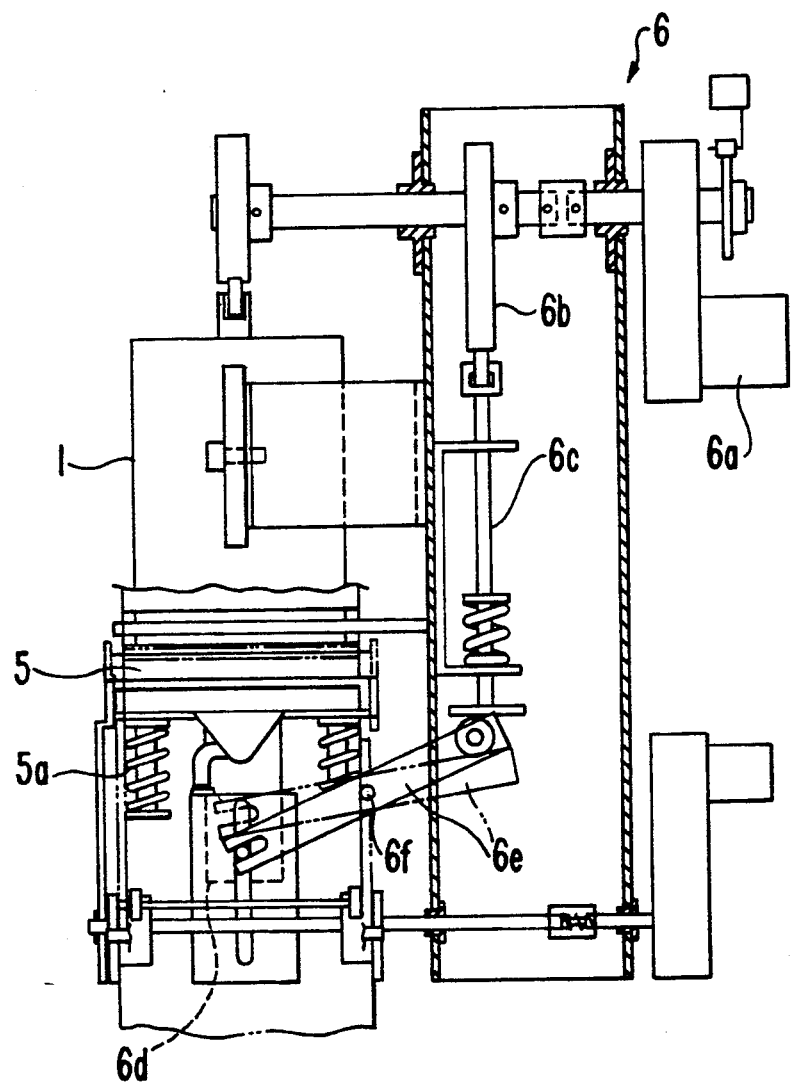
FIG. 2 is an enlarged side view of the prior art beverage extracting apparatus as shown in FIG. 1.
Figure 3:
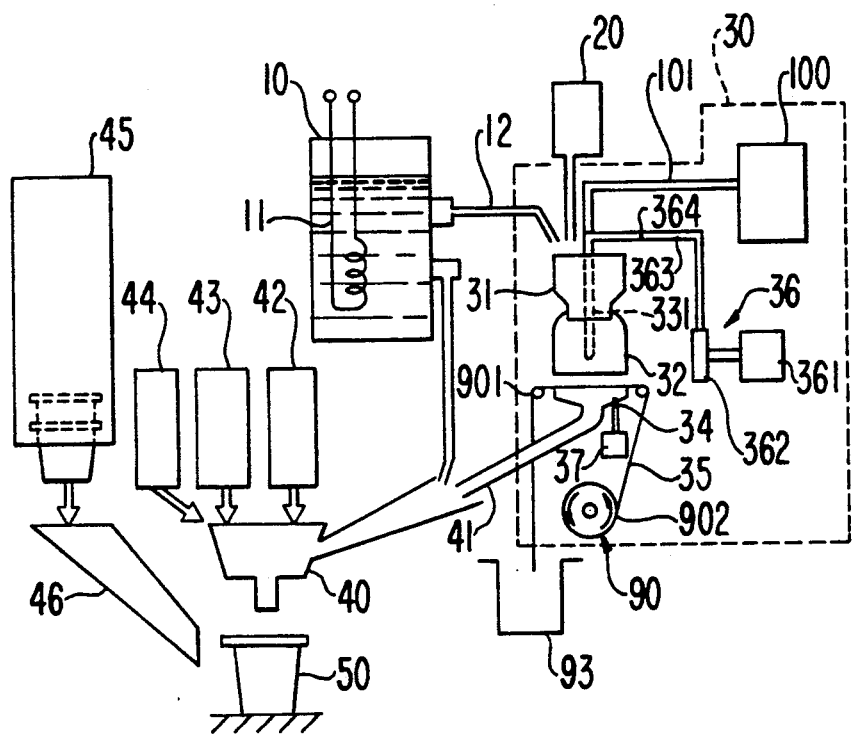
FIG. 3 is a schematic view of a vending machine including a beverage extracting apparatus in accordance with this invention.

Referring to the drawings, FIGS. 3 and 4 illustrate a preferred beverage extracting apparatus for vending machines according to this invention.

FIG. 3 shows a schematic structure of a vending machine which sells beverages such as coffee. Hot water storage tank 10 stores hot water heated by heater 11. Raw material bin 20 stores the raw material of the beverage, for example, coffee powder. Beverage extracting apparatus 30 mixes and stirs the hot water supplied from hot water storage tank 10 through hot water supply pipe 12 and the raw powder supplied from raw material bin 20. It also extracts a liquid from the mixture of hot water and raw powder. The extracted liquid is sent to mixing bin 40 through delivering pipe 41. After the sugar from sugar bin 42 and the cream from cream bin 43 are added to the liquid in the mixing bin, the liquid is poured into cup 50 which is sent from cup storing and delivering device 45 through chute 46. Coffee bin 44 for storing an instant coffee is also provided in the vending machine.

FIG. 4 shows the main portion of the beverage extracting apparatus 30 as shown in FIG. 3. Hopper 31 made of heat-proof plastic includes cylindrical side portion 311 and conical bottom portion 312 integrally formed therewith. Conical bottom portion 312 is aligned with cylindrical portion 311, and has a progressively smaller diameter towards its lower extremity. Cylindrical valve support 314 is fixed at the lower end portion of conical bottom portion 312 and is positioned at the center of hopper 31 to extend vertically therein. Cylindrical mixing chamber 32 has an inflow port 321 opened and closed by valve mechanism 33 on the upper portion thereof and an opening 322 on the bottom portion thereof. Mixing chamber 32 is formed integrally with hopper 31 at its upper end, and communicates with mixing hopper 31 through inflow port 321. The upper surface of mixing chamber 32 preferably forms a hemisphere.

Valve mechanism 33 includes main valve 331 which opens and closes inflow port 321, main valve shaft 332 which actuates main valve 331, auxiliary valve 333, auxiliary valve shaft 334 which actuates auxiliary valve 333, and coil spring 335.

Main valve 331 is made of rubber and formed in a semi-spherical shape. Flange portion 331a is formed on the outer circumferential surface of main valve 331 to facilitate sealing between hopper 31 and mixing chamber 32. Annular valve seat 331b is disposed on the bottom end of main valve 331.

Cylindrical main valve shaft 332 extends through the interior of cylindrical valve support 314. The upper end of main valve shaft 332 is exposed to atmospheric pressure. The lower end thereof extends through a hole 331c in main valve 331 and is fixed to main valve 331.

Auxiliary valve 333 is made of a stainless plate and is formed in the shape of a disc. The outer diameter of auxiliary valve 333 is less than that of main valve 331. Consequently, reduced pressure acts upon auxiliary valve 333 compared with main valve 331 due to its relatively small surface area.

Auxiliary valve shaft 334 extends through the interior of main valve shaft 332 with gap A therebetween (about 1–2 mm), and has a head portion 334a at its upper end which projects in the radial direction. Head portion 334a is positioned to contact the upper end of main valve shaft 332 when auxiliary valve shaft 334 moves downwardly. The lower end of auxiliary valve shaft 334 extends into mixing chamber 32 with auxiliary valve 333 fixedly secured on auxiliary valve shaft 334.

Coil spring 335 is disposed between the upper end of cylindrical valve support 314 and the lower end of head portion 334a of auxiliary valve shaft 334. Coil spring 335 urges auxiliary valve shaft 334 upwardly so that a gap B (about 4–5 mm) is maintained between the lower end of heat portion 334a and the upper end of main valve shaft 332. Accordingly, auxiliary valve 333 is urged toward valve seat 331b of main valve 331. Thus, an opening 332a on the lower end of main valve shaft 332 is closed by auxiliary valve 333.

Valve driving mechanism 36 (FIG. 3) is connected to head portion 334a of auxiliary valve shaft 334 through cam shaft 363, cam 362, and drive motor 361. Cam shaft 363 is pivotably supported at its central portion by pin 364, and is rotated by the vertical motion transmitted by the rotation of cam 362. Main valve shaft 332 and auxiliary valve shaft 334 are moved upwardly and downwardly in accordance with pivotal motion of cam shaft 363.

Pressure source 100, e.g., an air pump, is coupled with auxiliary valve shaft 334 through air tube 101 which is made of flexible plastic. Pressure source 100 supplies mixing chamber 32 with pressurized air through air tube 101 and the hollow auxiliary valve shaft 334.

A bottom opening 322 of mixing chamber 32 is covered by a filter 35, and is opened and closed by the vertical motion of filter support 34 disposed below the bottom opening. Filter support 34 is connected to delivering pipe 41. The liquid mixture filtrated by filter 35 is extracted through filter support 34 and discharged through delivering pipe 41 into mixing bin 40 as shown in FIG. 3. Filter sheet 35 is stretched across filter support 34 by rollers 901 and filter roll 902 located in the filter feeding mechanism 90. Filter support 34 is raised by solenoid 37 disposed below the filter support.

The process of extracting coffee is described as follows:

Hot water and coffee powder are deposited into the cylindrical hopper 31 from hot water storage tank 10 and bin 20. Hopper 31 combines the hot water and the coffee powder forming a liquid mixture.

When filter support 34 is moved upwardly by solenoid 37, filter 35 closes opening 322 on the bottom portion of mixing chamber 32. Drive motor 361 is then energized which rotates cam 362 causing cam shaft 363 to pivot counter clockwise around pin 364. Accordingly, auxiliary valve shaft 334 is lowered against the recoil strength of coil spring 335 causing auxiliary valve 333 to uncover opening 332a on the lower end of main valve shaft 332. As auxiliary valve shaft 334 is further lowered, main valve shaft 332 begins to lower after the gap B is closed. Consequently, main valve 331 opens inflow port 321, and the liquid mixture in hopper 31 is discharged into mixing chamber 32.

Next, pressurized air with bubbles is supplied from pressure source 100 into the liquid mixture in cylinder 32 through air tube 101 and auxiliary valve shaft 334. Thus, the liquid mixture is uniformly mixed by the pressurized air.

After commencing the mixing, drive motor 361 is energized again and cam 362 rotates further. Then auxiliary valve shaft 334 is urged upwardly by the restoring strength of coil spring 335. Simultaneously, auxiliary valve 333 seats on and closes opening 332a on the lower end of main valve shaft 332 as main valve 331 and main valve shaft 332 are lifted by the auxiliary valve 333. Accordingly, main valve 331 closes inflow port 321, and the communication between hopper 31 and mixing chamber 32 is prevented.

Since pressurized air is continuously supplied to mixing chamber 32, the pressure in mixing chamber 32 increases. Consequently, the liquid mixture is forcibly filtrated through filter 35. The coffee is extracted through filter 35, and sent to mixing bin 40 through delivery pipe 41. Coffee is thereafter mixed with milk and/or sugar, and poured into cup 50.

The process of dumping the spent grounds after extracting is described as follows:

Drive motor 361 is energized which rotates cam 362 and pivots cam shaft 363. Then auxiliary valve shaft 334 is moved downwardly against the recoil strength of coil spring 335. Auxiliary valve 333 unseats opening 332a on the lower end of main valve shaft 332. Accordingly, the high pressure air in cylinder 32 is vented to atmospheric pressure through gaps A and B, and the pressure of the air in mixing chamber 32 is reduced.

As auxiliary valve 333 uncovers opening 332a, the high pressure air in mixing chamber 32 is not substantially added to auxiliary valve 333 due to the relatively small surface area of auxiliary valve 333. Accordingly, auxiliary valve 333 can be easily detached from opening 332a by a small driving force. In addition, since auxiliary valve 333 is made of metal such as stainless steel and the main valve 331 is made of rubber, auxiliary valve 333 is not transformed or connected to opening 332a by the high pressure air in mixing chamber 32. Accordingly, auxiliary valve 333 easily responds to the driving force from drive motor 361. Furthermore, since opening 332a and auxiliary valve 333 are relatively removed from any residual liquid left on the lower surfaces of mixing chamber 32, liquid is not exhausted due to high pressure air through gap A. Therefore, the outlet port of bin 20 can be maintained dry, and its outlet is not obstructed with dryed raw powder.

As drive motor 361 continues to be energized, main valve shaft 332 is moved downward together with main valve 331 by vertical motion of auxiliary valve shaft 334. Main valve 331 thus opens inflow port 321. At this moment, the pressure in mixing chamber 32 has already been reduced, and any residual liquid mixture left in mixing chamber 32 is not scattered.

Then, filter support 34 is disconnected from opening 322 on the bottom end portion of mixing chamber 32. Finally, a fresh filter 35 is supplied onto filter support 34 by filter feeding mechanism 90.

This invention has been described in detail in connection with a preferred embodiment. The preferred embodiment, however, is not made for this invention only, and is not intended to be restricted thereto. It will be understood by those skilled in the art, that variations and modifications can be easily made within the scope of this invention, as defined by the appended claims.

We claim:

1. A beverage extracting apparatus for vending machines including:
    means, connected to a supply port, for combining water and beverage raw material to form a liquid mixture;
    a mixing chamber having an inflow port on its upper portion and a bottom opening on its bottom portion, and said liquid mixture being discharged into said mixing chamber through said inflow port;
    valve means for opening and closing said inflow port of said mixing chamber;
    means, associated with said bottom portion of said mixing chamber, for filtering said liquid mixture;
    means for supporting said filtering means, said filter supporting means opening and closing said bottom opening of said mixing chamber by vertically moving said filtering means; and
    means for pressurizing said mixing chamber when said inflow port is closed by said valve means and said bottom opening is closed by said filtering means to forcibly filtrate the liquid mixture stored in said mixing chamber through said filtering means;
the improvement comprising:
    a valve support fixedly disposed in said combining means and extending to said inflow port;
    said valve means including a main valve shaft extending inside of said valve support and having a main valve at its bottom end for opening and closing said inflow port;
    an auxiliary valve shaft extending inside of said main valve shaft with a gap between the inner surface of said main valve shaft and the outer surface of said auxiliary valve shaft;
    an auxiliary valve fixedly disposed on said auxiliary valve shaft for opening and closing said main valve shaft at its lower end, said auxiliary valve shaft having a head portion connected to a driving source; and
    a coil spring disposed between the lower end of said head portion and the upper end of said main valve shaft for urging said auxiliary valve shaft upwardly to have said auxiliary valve close said main valve shaft when closing said inflow port.

2. The improvement of claim 1 wherein said auxiliary valve has a diameter less than the diameter of said main valve.

3. The improvement of claim 1 wherein said main valve has a flange portion on its outer circumference.

4. The improvement of claim 1 wherein said main valve has an annular projection on its bottom end surface to receive said auxiliary valve.

5. The improvement of claim 1 wherein said auxiliary valve is made of metal.

6. The improvement of claim 5 wherein said auxiliary valve is made of stainless steel.

7. The improvement of claim 1 wherein said combining means comprises a cylindrical hopper.

8. The improvement of claim 1 wherein said mixing chamber is cylindrical.

9. A beverage extracting apparatus for vending machines comprising:
    means, connected to a supply port, for combining water and beverage raw material to form a liquid mixture;
    a mixing chamber having an inflow port and a bottom opening;
    main valve means, disposed in said inflow port, for discharging the liquid mixture into said mixing chamber;
    means, associated with said bottom opening of said mixing chamber, for filtering said liquid mixture;
    means for supporting said filtering means, said filter supporting means opening and closing said bottom opening of said mixing chamber;
    means for pressurizing said mixing chamber with a gas; and
    an auxiliary valve means, disposed in said mixing chamber, for exhausting said pressurized gas in said mixing chamber.

10. The beverage extracting apparatus according to claim 9 wherein said main valve means further comprises a main valve shaft fixed to said main valve means, said main valve shaft extending into said combining means.

11. The beverage extracting apparatus according to claim 10 wherein said auxiliary valve further comprises an auxiliary valve shaft fixed to said auxiliary valve, said auxiliary valve shaft having an upper end in said combining means and a lower end in said mixing chamber, said auxiliary valve shaft being disposed within said main valve shaft, said auxiliary valve secured to said auxiliary valve shaft in said mixing chamber.

12. The beverage extracting apparatus according to claim 11 wherein a gap is developed between said auxiliary valve shaft and said main valve shaft.

13. The beverage extracting apparatus according to claim 12 wherein said gap vents said pressurized mixing chamber when said auxiliary valve unseats from said main valve means.

14. The beverage extracting apparatus according to claim 11 further comprising a cylindrical valve support fixedly disposed in said combining means, said main valve shaft being disposed within said cylindrical valve support.

15. The beverage extracting apparatus according to claim 14 further comprising a coil spring disposed between a head portion of said auxiliary valve shaft and said cylindrical valve support for urging said auxiliary valve shaft upwardly.

16. The beverage extracting apparatus according to claim 15 wherein said upward urging of said auxiliary valve shaft seats said auxiliary valve against said main valve means.

17. The beverage extracting apparatus according to claim 11 wherein said auxiliary valve shaft opens and closes said main valve shaft at its lower end, said auxiliary valve shaft having a head portion connected to a driving source.

18. The beverage extracting apparatus according to claim 9 wherein said auxiliary valve has a diameter less than the diameter of said main valve means.

19. The beverage extracting apparatus according to claim 9 wherein said main valve means further comprises a flange portion on its outer circumference.

20. The beverage extracting apparatus according to claim 9 wherein said main valve means further comprises an annular projection on its bottom end surface to receive said auxiliary valve.

21. The beverage extracting apparatus according to claim 20 wherein said auxiliary valve is made of stainless steel.

22. The beverage extracting apparatus according to claim 9 wherein said auxiliary valve is made of metal.

23. A beverage extracting apparatus for vending machines comprising:
   means, connected to a supply port, for combining water and beverage raw material to form a liquid mixture;
   a mixing chamber having an inflow port and a bottom opening;
   main valve means, disposed in said inflow port, for discharging the liquid mixture into said mixing chamber;
   means, associated with said bottom opening of said mixing chamber, for filtering said liquid mixture;
   means for supporting said filtering means, said filter supporting means opening and closing said bottom opening of said mixing chamber;
   means for pressurizing said mixing chamber with a gas; and
   an auxiliary valve means disposed in said mixing chamber for exhausting said pressurized gas in said mixing chamber;
   wherein said auxiliary valve means seats against said main valve means in said mixing chamber.

* * * * *